United States Patent
Van Dorrselaer et al.

(10) Patent No.: US 9,781,754 B2
(45) Date of Patent: Oct. 3, 2017

(54) METHOD FOR OPTIMIZING A WIRELESS NETWORK CONNECTION

(71) Applicant: THOMSON LICENSING, Issy de Moulineaux (FR)

(72) Inventors: Karel Van Dorrselaer, Edegem (BE); Koen Van Oost, Borsbeek (BE)

(73) Assignee: Thomson Licensing, Issy-les-Moulineaux (FR)

( * ) Notice: Subject to any disclaimer, the term of this patent is extended or adjusted under 35 U.S.C. 154(b) by 57 days.

(21) Appl. No.: 14/646,382

(22) PCT Filed: Nov. 20, 2013

(86) PCT No.: PCT/EP2013/074299
§ 371 (c)(1),
(2) Date: May 20, 2015

(87) PCT Pub. No.: WO2014/079894
PCT Pub. Date: May 30, 2014

(65) Prior Publication Data
US 2015/0312955 A1    Oct. 29, 2015

(30) Foreign Application Priority Data
Nov. 21, 2012  (EP) .................................. 12306446

(51) Int. Cl.
*H04W 76/02*    (2009.01)
*H04W 24/08*    (2009.01)
(Continued)

(52) U.S. Cl.
CPC ......... *H04W 76/023* (2013.01); *H04W 24/02* (2013.01); *H04W 24/08* (2013.01); *H04W 74/0816* (2013.01)

(58) Field of Classification Search
CPC ... H04W 76/023; H04W 24/08; H04W 24/02; H04W 74/0816
See application file for complete search history.

(56) References Cited

U.S. PATENT DOCUMENTS 7,103,386 B2    9/2006  Hoffmann et al.
7,200,149 B1 *  4/2007  Hasty, Jr. .............. H04W 8/005
                                                              370/255
(Continued)

FOREIGN PATENT DOCUMENTS

EP    1495589    1/2005
EP    1699175    9/2006
(Continued)

OTHER PUBLICATIONS

Korakis et al: "CDR-MAC: A Protocol for Full Exploitation of Directional Antennas in Ad Hoc Wireless Networks", IEEE Transactions on Mobile Computing, IEEE Service Center, vol. 7, No. 2, Feb. 1, 2008 (Feb. 1, 2008), pp. 145-155.
(Continued)

*Primary Examiner* — Kashif Siddiqui
*Assistant Examiner* — Minjung Kim
(74) *Attorney, Agent, or Firm* — Myers Wolin, LLC

(57) ABSTRACT

The invention proposes a method for optimizing a wireless network connection when at least one of the devices comprises a configurable antenna. For avoiding Hidden Nodes problems, it is proposed to modify the configurable antenna in such a way that the number of third network devices seen only by the network device having the configurable antenna is minimized.

16 Claims, 2 Drawing Sheets

Figure 1:
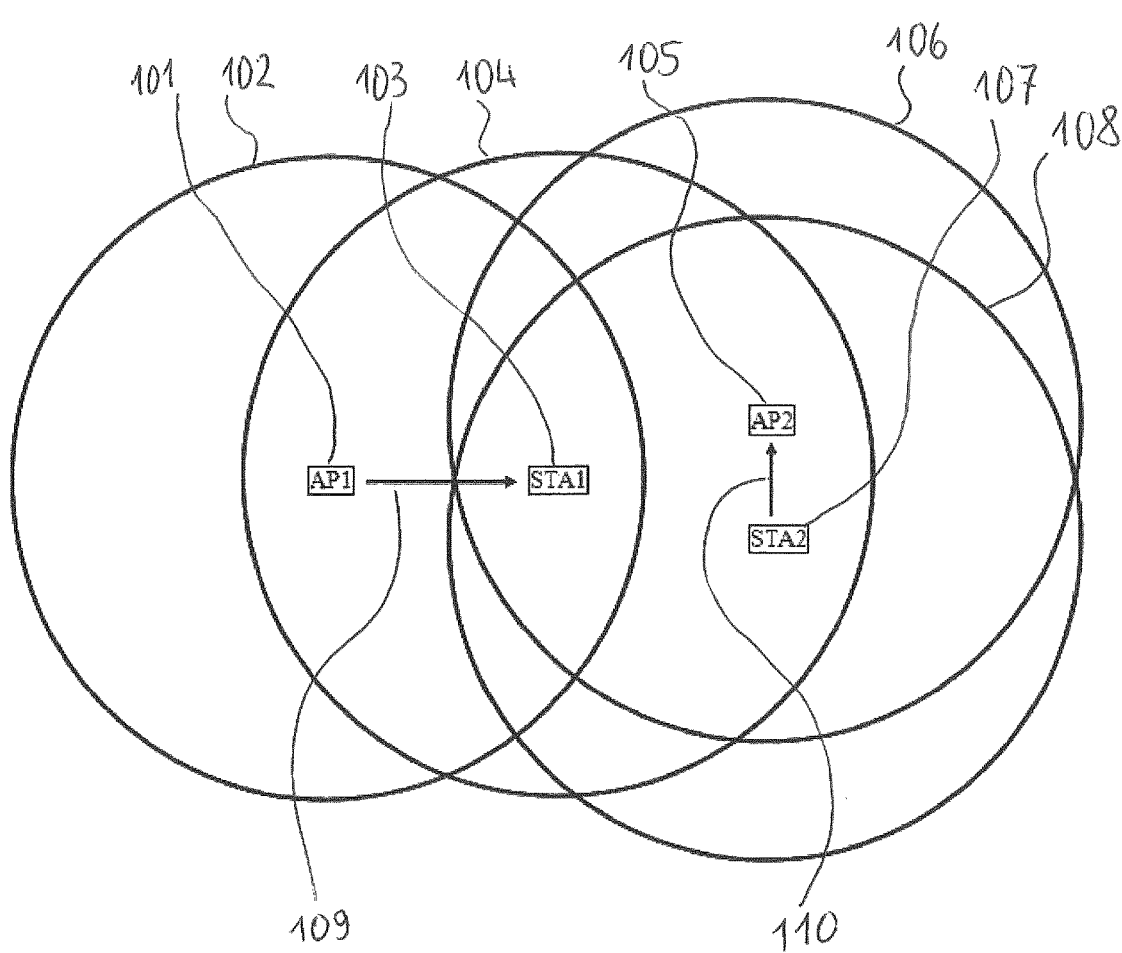

(51) Int. Cl.
*H04W 24/02* (2009.01)
*H04W 74/08* (2009.01)

(56) References Cited

U.S. PATENT DOCUMENTS

| | | | |
|---|---|---|---|
| 2005/0075141 A1* | 4/2005 | Hoffmann | H04B 7/0408 455/562.1 |
| 2007/0036091 A1 | 2/2007 | Kuan et al. | |
| 2010/0208618 A1 | 8/2010 | Kim et al. | |
| 2011/0090835 A1* | 4/2011 | Furukawa | H04W 40/06 370/312 |

FOREIGN PATENT DOCUMENTS

| JP | 2005-522940 A | 7/2005 |
|---|---|---|
| JP | 2006-197639 A | 7/2006 |
| JP | 2007-524272 A | 8/2007 |

OTHER PUBLICATIONS

Bazan et al: "A Survey On MAC Protocols for Wireless Adhoc Networks with Beamforming Antennas", IEEE Communications Surveys, IEEE, vol. 14, No. 2, Apr. 1, 2012 (Apr. 1, 2012), pp. 216-239.

Kwon et al.: "Dynamic group allocation scheme for avoiding hidden node problem in IEEE 802.15.4"; 2009 9th International Symposium on Communications and Information Technology. ISCIT 2009; pp. 28-30 Sep. 2009.

Gossain et al.: "Cross-layer directional antenna MAC protocol for wireless ad hoc networks"; Wireless Communications & Mobile Computing | 6 (2): pp. 171-182; Mar. 2006.

Anonymous: "Hidden Node Problem"; From Wikipedia, the free encyclopedia; http://en.wikipedia.org/wiki/Hidden_node_problem; Retrieval Date: Jul. 3, 2012; pp. 1-5.

Search Report Dated Jan. 15, 2014.

* cited by examiner

METHOD FOR OPTIMIZING A WIRELESS NETWORK CONNECTION

This application claims the benefit, under 35 U.S.C. §365 of International Application PCT/EP2013/074299, filed Nov. 20, 2013, which was published in accordance with PCT Article 21(2) on May 30, 2014 in English and which claims the benefit of European patent application No 12306446.1, filed Nov. 21, 2012.

The present invention relates to a method for optimizing a wireless network connection between a first device and a second device, in particular when at least one of the devices comprises a configurable antenna.

INTRODUCTION AND PRIOR ART

Increased proliferation of Wireless Local Area Networks or WLANs, e.g. according to the so-called Wi-Fi technology, cause an increase in issues with respect to performance degradation due to interference from surrounding other WLANs or non-Wi-Fi systems that share the physical medium. If all network devices are within range or reach of each other, this is also denoted as that they "see" each other. For this case network protocols exist, for instance Wi-Fi's Medium Access protocol Carrier Sense Multiple Access—Collision Avoidance—CSMA-CA, which make sure that the medium is shared properly between the different devices. The underlying concept is, that each network device that has a packet to send has to wait until the medium is clear, and in case it is not, to respect a certain random back-off time before it can send its packet. In that way, collisions between packets can be avoided.

One speaks of a hidden node, also denoted as hidden station, if, in the vicinity of a functional wireless network connection between a first device and a second device, a third device exists, which is "visible" to the first device, but not visible to the second device. In this case, the third device is a hidden node for the second device.

As soon as there are hidden nodes as further described below, collisions can occur, and the efficiency of the CSMA-CA mechanism is strongly reduced. In densely populated areas, this problem occurs more and more often up to the point that in some areas Wi-Fi has become completely unusable. Today, this is only the case in the 2.4 GHz band, but the same situation is expected to occur in the coming years for the 5 GHz band.

Traditionally, a complete network collapse due to hidden nodes is countered by RTS/CTS mechanisms, but these mechanisms come with a significant overhead. Before each unicast dataframe, the transmitting node is sending, in broadcast mode, a Request-To-Send packet also denoted as RTS which comprises an indication as to how much time the packet will take. The RTS packet has to be answered by a Clear-To-Send packet, also denoted as CTS, from the receiving node. The CTS packet echoes how much time the packet will take. Each Wi-Fi node that hears either the CTS or the RTS packet, has to respect the time requested to keep the medium free. Besides the additional overhead, the RTS-CTS method is not protecting broadcast frames. It is known that in densely populated areas people are losing their wireless connections repeatedly because the beacons from their wireless gateway or access point are too frequently colliding with packets from hidden Wi-Fi Nodes. This is described in more detail below.

FIG. 1 shows, in a symbolic plan view, a first, prior art wireless network configuration. The first network configuration comprises, as network devices, a first Access Point AP1 101, a second Access Point AP2 105, a first Station STA1 103, and a second station STA2 107. FIG. 1 also illustrates the visibility ranges of the network devices, i.e. the ranges inside of which the network devices are able to receive data from other network devices. They are the first Access Point's visibility range 102, the second Access Point's visibility range 106, the first Station's visibility range 104, and the second Station's visibility range 108. It is assumed here, without loss of generality, that the visibility ranges are not direction dependent, hence they are illustrated as circles centered at the respective network device. Only for ease of illustration, and without loss of generality, the visibility ranges of the network devices in FIG. 1 are shown to have the same radius.

In the network configuration depicted in FIG. 1, the first Access Point 101 is assumed to be wirelessly connected 109 to the first Station 103 forming a first local network, and the second Access Point 105 is assumed to be wirelessly connected 110 to the second Station 107 forming a second local network.

As a practical example, the first Access Point 101 may correspond to a private network gateway located in the middle of an apartment. The first Station 103 may correspond to a laptop, operated within reach of and connected to the first Access Point 101, and located in a room near an outer wall of the apartment and near a street outside of the apartment. The second Access point 105 and the second Station 107 may correspond to parts of a very busy company network located across the street from the apartment.

In the configuration shown in FIG. 1,
- the first Access Point 101 sees the first Station 103, but it does not see the second Access Point 105 nor the second Station 107;
- the first Station 103 sees the first Access Point 101, the second Access Point 105, and the second Station 107;
- the second Access Point 105 sees the first Station 103 and the second Station 107, but it does not see the first Access Point 101; and
- the second Station 107 sees the first Station 103 and the second Access Point 105, but it does not see the first Access Point 101.

In this situation, a first consequence of the Hidden Node Problem can occur, described as follows:
Assume that the first Access Point 101 has a packet to send to the first Station 103. If the first Station 103 is not sending anything, the first Access Point 101 will consider the medium free, and will send its packet.
If, during the time when the first Access Point 101 sends its packet to the first Station 103, the second Station 107 has a packet to send to the second Access Point 105, the second Station 107, because of being out of range for packets coming from the first Access Point 101, will also consider the medium free—and will send its packet to the second Access Point 105. In that case, the receiver of the first Station 103, because of being in range of both the first Access Point 101 and the second Station 107, will see a collision of the packet coming from the first Access Point 101 with the packet coming from the second Station 107.
The first Station 103 will therefore not be able to decode the packet from the first Access Point 101. At that moment, robustness mechanisms of the network may be employed, like retransmission, larger back-off times, lowered modulation rates etc. But as a side-effect they all drastically reduce the total throughput over the medium, and cannot guarantee a sustainable solution.

As mentioned, when Hidden Node Problems occur during transmission of data frames, it is known to use the RTS/CTS mechanism at the price of a certain overhead and a decreased performance. For broadcast management frames and multicast/broadcast data frames, however, not even RTS/CTS is possible. This is why hidden node problems have a particular impact on the transmission and mechanism of so-called "beacons". Beacons are broadcast management frames that can be said to constitute the "heartbeat" of a Wi-Fi network. An Access Point has to send out a beacon regularly. The time between beacons is configurable, but a value of 100 ms is commonly used in Wi-Fi. If a Station is not seeing beacons anymore from the Access Point it is connected to, it considers that it has gone out of range and disconnects.

This constitutes a second consequence of hidden node problems. As an example, assume that the first local network in FIG. 1 has very little activity. Basically then, most of the time, only beacons are being sent, e.g. every 100 ms, by the first Access Point 101. Suppose now that the second Station 107 intends to perform a download of a large file through the second Access Point 105. Because the first Access Point 101 is out of range for the second Access Point 105, the second Access Point 105 is not seeing the beacons sent by the first Access Point 101, i.e. it doesn't see any activity from any other Wi-Fi node. Therefore, the second Access Point 105 will grab the complete medium for the total duration of the download. This means that, during this download, the first Station 103 will not see any beacons from the first Access Point 101 anymore, as they will all collide with data frames from the second Access Point 105. The first Station 103 will thus disconnect.

In summary, the effects of hidden nodes are not only to deteriorate the WLAN performance during active usage, but also to cause persistent connect-disconnect cycles whenever other neighboring networks are in use. If the interfering network is a business WLAN, this basically means that connect-disconnect problems are to be expected all the time during working hours.

Patent Publication U.S. Pat. No. 7,103,386 B2 to Hoffmann et al. purports to disclose a method for operating an access point in a wireless local area network or WLAN. The access point includes a directional antenna for communicating with a plurality of remote stations, and the directional antenna includes a plurality of antenna patterns. The method includes creating an antenna database by associating between the access point and each remote station a respective measured signal quality corresponding to the plurality of antenna patterns. The respective measured signal qualities are determined by the access point based upon communications with each remote station. The method further includes determining for each remote station a preferred antenna pattern based upon the antenna database, and selecting a remote station and the corresponding preferred antenna pattern to communicate with. As one way of dealing with the hidden node problem, it is determined, based upon the antenna database and prior to communicating with the selected remote station, if any non-selected remote stations have the potential of not being aware when such communications actually occurs. This can occur when two stations hidden from each other are connected to the same access point. Use of an omnidirectional RTS/CTS is described for these cases.

Gossain etal's article "Cross-layer directional antenna MAC protocol for wireless ad hoc networks", in WIRELESS COMMUNICATIONS & MOBILE COMPUTING|6 (2): pp. 171-182; March 2006 purports to disclose a directional antenna medium access protocol also denoted as DAMA, and its enhanced version called enhanced DAMA or EDAMA, which takes advantage of the benefits offered by directional antennas. A pair of communicating nodes using these schemes simultaneously transmits the circular directional RTS and CTS only to those sectors with neighbors, hence reducing overall communication delay and enhancing throughput. Unlike DAMA, which uses a single MAC buffer for all antenna beams as in IEEE 802.11, EDAMA employs separate buffers for each of the antenna sectors and introduces an integrated network and MAC cross-layer design.

The disclosed protocol can be seen to have the drawback that hidden nodes are not avoided.

Improvements in the detection and avoidance of Hidden Nodes also known as Hidden Stations are thus desirable.

SUMMARY OF THE INVENTION

According to the invention, a communication path between a first network device and a second network device must first be established. Then, the communication path is used to compare network devices as seen by the first network device to network devices as seen by the second network device. This enables that Hidden Nodes are identified. Presence and use of a configurable antenna is assumed on the second network device. The configurable antenna is then modified in such a way that, as much as possible, the second network device is not seeing any network devices anymore that are hidden, i.e. invisible, to the first network device.

Correspondingly, the invention proposes a method to configure a wireless network connection between a first network device and a second network device having a configurable antenna. A data connection is established between the first network device and the second network device. From the first network device to the second network device, over the data connection, a first Devices Seen List is sent. The first Devices Seen List comprises identifications of all those third network devices from which the first network device, using the wireless network, is able to receive data. In the second network device it is then tested, whether the second network device, using the wireless network and the configurable antenna, is able to receive data from any Extra Network Devices. As Extra Network Devices we denote here any third network devices other than those comprised in the first Devices Seen List. If Extra Network Devices exist, the configurable antenna is modified in such a way as to minimize the number of Extra Network Devices. This amounts to a deliberate, direction dependent or non-omnidirectional restriction of the visibility range of the second network device.

The advantage of the method according to the invention is that, by deliberately restricting the visibility range of the second network device, hidden nodes in general and the described beacon problems are avoided. Of course, the degree to which this can be achieved depends on the number of involved network devices, but also on the amount of flexibility of configuration that is provided by the specific configurable antenna.

The known method for operating an access point including a directional antenna described above is based on signal quality. Assuming that the configurable antenna is a sectorized antenna, this amounts to deactivating all those sectors of the sectorized antenna, that do not actively contribute to the signal quality of the existing network connection. This can be seen to have the effect that in many cases, only a single sector of the antenna, namely that in which the other device is situated, will be kept active.

In contrast, the method to configure a wireless network connection proposed here amounts to deactivating only those parts of the directional characteristic of a sectorized antenna, that specifically would contribute hidden nodes. Sectors of the antenna directional characteristic that do not reduce the number of visible hidden nodes are maintained in operation. In that way, advantageously, a later entrance of other network devices into the wireless network is not hindered.

DETAILED DESCRIPTION OF AN EMBODIMENT

Figure 2:
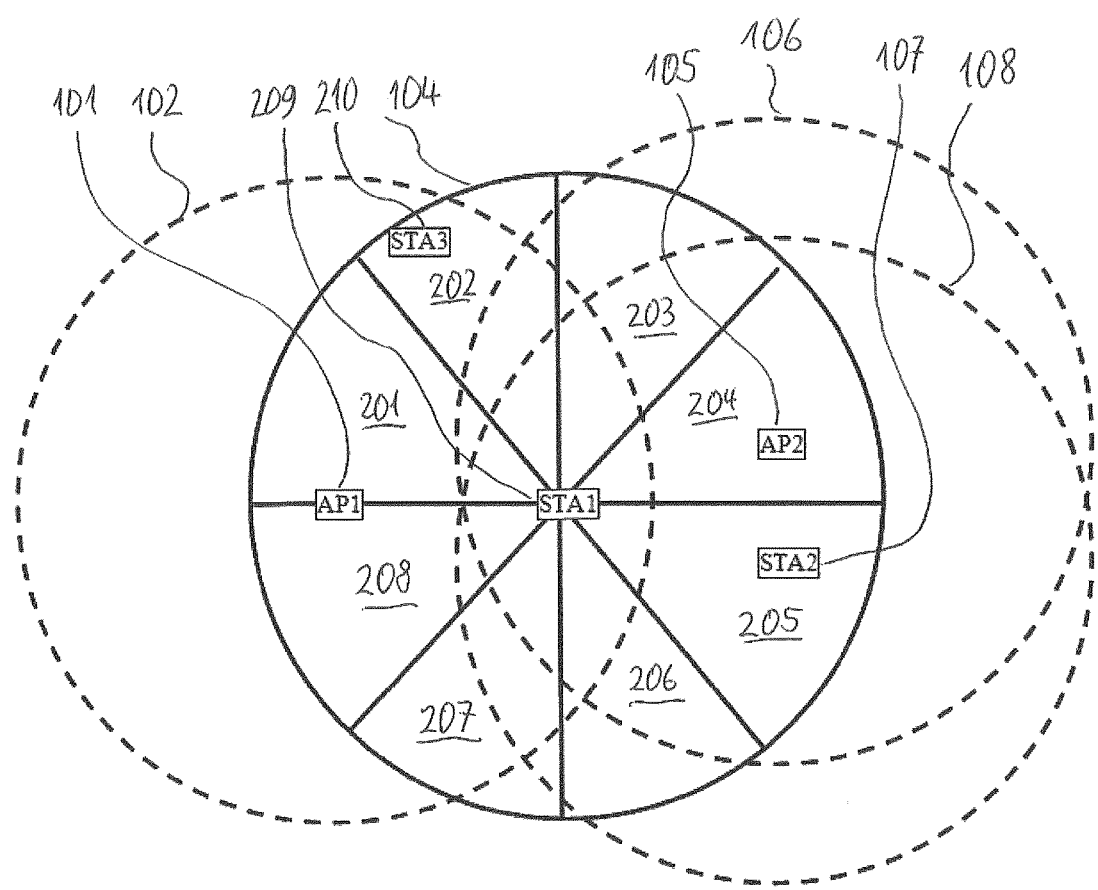

A preferred embodiment of the present invention is described with reference to the accompanying drawings. In these, FIG. 1 shows a first, prior art wireless network configuration;

FIG. 2 shows a second wireless network configuration for illustrating this invention.

FIG. 2 shows a second wireless network configuration for illustrating this invention. The second wireless network configuration comprises, denoted by respectively identical Reference Numerals, most network devices that are also contained in the first wireless network configuration. However, the first Station STA1, different from the situation shown in FIG. 1, is assumed here to comprise a configurable antenna, and is therefore denoted by Reference Numeral 209. Without loss of generality, the configurable antenna of the first Station 209 is assumed here to comprise 8 angular sectors which can individually be used or disused, so that individual directional characteristics of the configurable antenna result. The 8 angular sectors are symbolically indicated in FIG. 2 in that the first Station's visibility range 104 is subdivided into sectors 201, 202, 203, 204, 205, 206, 207, and 208. The second wireless network configuration comprises also a third Station STA3 210.

In the example case depicted in FIG. 2, the first Access Point 101 is the embodiment of the first network device, and the first Station 209 is the embodiment of the second network device having the configurable antenna.

According to the method of the invention, a communication path or data connection is first established between the first network device 101 and the second network device 209.

This data connection can be established over the wireless network, but alternatively it could be established by other means, wireless or wire-bound, proprietary or standardized. It is used only for the single step of sending the list of network devices seen by the first network device to the second network device.

In the example case depicted in FIG. 2, the first Access Point 101 sees the first Station 209 and the third Station 210. Hence the first Devices Seen List consists of unique identifiers for these two network devices, and is sent to the first Station 209.

Now the first Station 209, in its role as second network device, can start the step of testing whether it "sees" any Extra Network Devices. Since we are at the start of the method, the configurable antenna is preferably operated in omnidirectional mode. Therefore, in the example situation depicted in FIG. 2, the first Station 209 in total sees the first Access Point 101, the third Station 210, the second access point 105, and the second Station 107. Of these, the first Access Point 101, by virtue of being one of the participants of the first local network, is not a third network device, and the third Station 210 is comprised in the first Devices Seen List. Therefore, only the second access point 105 and the second Station 107 remain as two Extra Network Devices.

For modifying the configurable antenna in such a way as to minimize the number of Extra Network Devices, each of the antenna sectors is now sequentially investigated and set to passive only if the number of Extra Network Devices decreases.

In the example situation depicted in FIG. 2, and assuming that the third Station 210 is not yet in operation, Setting to passive the first antenna sector 201 would not reduce the visibility of the Extra Network Devices, and is hence not performed;

The same holds for the second antenna sector 202 and the third antenna sector 203;

Setting to passive the fourth antenna sector 204 eliminates the visibility of the second Access Point 105, thus reducing the number of Extra Network Devices by one. It is therefore performed;

Setting to passive the fifth antenna sector 205 eliminates the visibility of the second Station 107, thus reducing the number of Extra Network Devices by one. It is thus performed;

Setting to passive the sixth antenna sector 206 would not reduce the visibility of the Extra Network Devices, and is hence not performed;

The same holds for the seventh antenna sector 207 and the eighth antenna sector 208.

At the end of this sequential modification of the configurable antenna, the resulting directional characteristic comprises the sectors 201-203 and 206-208, which together cover a 270 degree angle. The 90 degree angle of sectors 204, 205 is not covered, so that the Extra Network Devices situated in these two sectors are no longer visible.

In this situation it is immediately evident that, if a third Station STA3 210 enters the wireless network, it is covered by the active antenna sector 202, and hence is visible to the first Access Point 101 as well as to the first Station 209, so that its entrance into the first local network is not hindered.

In the foregoing description it has been assumed that the antenna configuration at the beginning of the method is an omnidirectional one. But the method can also be employed with an arbitrary start antenna configuration, which makes it possible to apply it repeatedly, in regular or irregular intervals. This has the advantage that it allows to take into account, on a running basis, slow variations in the wireless configuration. In this case, a step of modifying the configurable antenna would advantageously also comprise to set to active any antenna sectors as long as this does not increase the number of Extra Network Devices.

In the foregoing, the configuration method according to the present invention has been described in an embodiment which involves a static sectorized antenna. But the method can also be employed when the configurable antenna employs digital beam forming.

Note that, when the method of the invention is employed in a system where the antenna has only very few sectors, a situation may arise where the method step of setting to passive one of these sectors does indeed eliminate the visibility of an Extra Network Device, but at the same time deteriorates or interrupts the network connection between the first and second network device. In these cases it is advantageous to set sectors to passive only under the additional condition that the network connection is not impaired.

With other words, the invention proposes a method for optimizing a wireless network connection when at least one of the devices comprises a configurable antenna. For avoiding Hidden Nodes problems, it is proposed to modify the configurable antenna in such a way that the number of third network devices seen only by the network device having the configurable antenna is minimized.

The invention claimed is:

1. In a second network device having a configurable antenna having distinct antenna sectors that can individually be active or passive, a method to configure a wireless network connection between the second network device and a first network device, the method comprising:
    establishing a data connection between the second network device and the first network device;
    receiving from the first network device over the data connection a first Devices Seen List comprising identifications of all those third network devices from which the first network device, using a wireless network, is able to receive data;
    testing, in the second network device, whether the second network device, using the wireless network and the configurable antenna, is able to receive data from any Extra Network Devices being third network devices other than those comprised in the first Devices Seen List;
    if the second network device is able to receive data from any Extra Network Devices, setting to active at least one antenna sector when doing so does not increase the number of Extra Network Devices.

2. A method according to claim 1, where the step of testing comprises
    compiling a second Devices Seen List comprising identifications of all those third network devices from which the second network device is able to receive data when using the configurable antenna;
    comparing the first Devices Seen List with the second Devices Seen List and considering the second network device as being able to receive data from any Extra Network Devices if the second Devices Seen List comprises identifications of third network devices that are not comprised in the first Devices Seen List.

3. A method according to claim 1, used in the second network device, wherein at least one antenna sector is set to passive if doing so decreases the number of Extra Network Devices.

4. A method according to claim 3, where at the step of establishing the data connection between the second network device and the first network device, all antenna sectors are set to active.

5. A method according to claim 1, where the data connection is established using the wireless network connection.

6. A method according to claim 5, where for the data connection the configurable antenna is operated in an omni-directional mode.

7. A method according to claim 1, where the data connection is established by means different from the wireless network connection.

8. A network device having a configurable antenna, and being equipped and configured to carry out a method according to claim 1.

9. A system to configure a wireless network connection, comprising a first network device and a second network device having a configurable antenna, the first network device being equipped and configured to establish a data connection with the second network device, and to send to the second network device over the data connection a first Devices Seen List comprising identifications of all those third network devices from which the first network device, using a wireless network, is able to receive data; and the second network device being equipped and configured to carry out a method according to claim 1.

10. A method to configure a wireless network connection between a first network device and a second network device having a configurable antenna, the method comprising:
    establishing a data connection between the first network device and the second network device;
    sending, from the first network device to the second network device over the data connection, a first Devices Seen List comprising identifications of all those third network devices from which the first network device, using a wireless network, is able to receive data;
    testing, in the second network device, whether the second network device, using the wireless network and the configurable antenna, is able to receive data from any Extra Network Devices being third network devices other than those comprised in the first Devices Seen List;
    if the second network device is able to receive data from any Extra Network Devices, setting to active at least one antenna sector when doing so does not increase the number of Extra Network Devices.

11. A method according to claim 10, where the step of testing comprises
    compiling a second Devices Seen List comprising identifications of all those third network devices from which the second network device is able to receive data when using the configurable antenna;
    comparing the first Devices Seen List with the second Devices Seen List and considering the second network device as being able to receive data from any Extra Network Devices if the second Devices Seen List comprises identifications of third network devices that are not comprised in the first Devices Seen List.

12. A method according to claim 10, where the data connection is established using the wireless network connection.

13. A method according to claim 12, where for the data connection the configurable antenna is operated in an omni-directional mode.

14. A method according to claim 10, where the data connection is established by means different from the wireless network connection.

15. A second network device having a configurable antenna having distinct antenna sectors that can individually be active or passive, capable of configuring a wireless network connection between the second network device and a first network device, said second network device comprising at least a hardware processor configured to:
    establish a data connection between the second network device and the first network device;
    receive from the first network device over the data connection a first Devices Seen List comprising identifications of all those third network devices from which the first network device, using a wireless network, is able to receive data;
    test, whether the second network device, using the wireless network and the configurable antenna, is able to receive data from any Extra Network Devices being third network devices other than those comprised in the first Devices Seen List;
    if the second network device is able to receive data from any Extra Network Devices, set to active at least one antenna sector when doing so does not increase the number of Extra Network Devices.

16. The second network device according to claim 15, wherein testing comprises
- compiling a second Devices Seen List comprising identifications of all those third network devices from which the second network device is able to receive data when using the configurable antenna;
- comparing the first Devices Seen List with the second Devices Seen List and considering the second network device as being able to receive data from any Extra Network Devices if the second Devices Seen List comprises identifications of third network devices that are not comprised in the first Devices Seen List.

\* \* \* \* \*